United States Patent
Meyer et al.

(10) Patent No.: US 9,535,482 B2
(45) Date of Patent: Jan. 3, 2017

(54) METHODS, SYSTEMS, AND COMPUTER READABLE MEDIA FOR CONTROLLING PROCESSOR CARD POWER CONSUMPTION IN A NETWORK TEST EQUIPMENT CHASSIS THAT INCLUDES A PLURALITY OF PROCESSOR CARDS

(71) Applicant: Ixia, Calabasas, CA (US)

(72) Inventors: Raymond Anthony Meyer, Oak Park, CA (US); Manley Klassen, Oxnard, CA (US)

(73) Assignee: Ixia, Calabasas, CA (US)

( * ) Notice: Subject to any disclaimer, the term of this patent is extended or adjusted under 35 U.S.C. 154(b) by 476 days.

(21) Appl. No.: 13/785,899

(22) Filed: Mar. 5, 2013

(65) Prior Publication Data
US 2014/0258744 A1    Sep. 11, 2014

(51) Int. Cl.
G06F 1/26    (2006.01)
G06F 1/32    (2006.01)
H04L 12/26    (2006.01)

(52) U.S. Cl.
CPC ........... *G06F 1/3203* (2013.01); *G06F 1/3287* (2013.01); *H04L 43/50* (2013.01); *Y02B 60/1282* (2013.01)

(58) Field of Classification Search
CPC .................................................... G06F 1/3203
USPC ........................................................ 713/320
See application file for complete search history.

(56) References Cited

U.S. PATENT DOCUMENTS

| | | | |
|---|---|---|---|
| 6,631,409 B1 * | 10/2003 | Watson et al. | 709/224 |
| 7,616,518 B2 | 11/2009 | Im et al. | |
| 2004/0255171 A1 * | 12/2004 | Zimmer et al. | 713/300 |
| 2007/0050644 A1 * | 3/2007 | Merkin | 713/300 |
| 2008/0313476 A1 * | 12/2008 | Hansen | 713/300 |
| 2009/0055665 A1 * | 2/2009 | Maglione et al. | 713/320 |
| 2012/0137158 A1 * | 5/2012 | Nelluri et al. | 713/340 |
| 2012/0233473 A1 * | 9/2012 | Vasseur et al. | 713/300 |

OTHER PUBLICATIONS

May 23, 2011-Jul. 10, 2012 internal wiki disclosing prior version of platform on which invention is implemented.

* cited by examiner

*Primary Examiner* — Thomas Lee
*Assistant Examiner* — Volvick Derose
(74) *Attorney, Agent, or Firm* — Jenkins, Wilson, Taylor & Hunt, P.A.

(57) ABSTRACT

Methods, systems, and computer readable media for controlling processor card power consumption are disclosed. In one example, the method is conducted in a network test equipment chassis that includes a plurality of processor cards that implements network testing functions. The method includes detecting an event or status associated with one of the plurality of processor cards and determining whether the event or status satisfies a condition of at least one power management rule. In response to determining that the event or status satisfies a condition of the at least one power management rule, the method further includes adjusting power consumption of the processor card in the network test equipment in accordance with the at least one power management rule.

26 Claims, 8 Drawing Sheets

METHODS, SYSTEMS, AND COMPUTER READABLE MEDIA FOR CONTROLLING PROCESSOR CARD POWER CONSUMPTION IN A NETWORK TEST EQUIPMENT CHASSIS THAT INCLUDES A PLURALITY OF PROCESSOR CARDS

TECHNICAL FIELD

The subject matter described herein relates to network equipment testing. More specifically, the subject matter relates to methods, systems, and computer readable media for controlling processor card power consumption in a network test equipment chassis that includes a plurality of processor cards.

BACKGROUND

Network test systems, such as network load testing systems and application test systems, can be used to simulate various network traffic conditions in both laboratory and live-network environments. The test packet generation and analysis functions provided by these test systems are processor resource-intensive, and consequently, consume a significant amount of power. However, in some instances, a network test system may be in an idle up to 50% of its operating time. Although a network test system may be in an idle state, the load modules (e.g., processor cards/blades) are typically powered during this idle state. If power usage by the load module can be minimized during this idle time, the potential annual savings for a single network test equipment (NTE) chassis would be significant. Additional savings may also be possible if hardware cooling needs are considered. Given the size of some internal test equipment laboratories, the ability to minimize power consumption during idle periods could result in considerable annual savings power costs.

Accordingly, in light of these difficulties, a need exists for methods, systems, and computer readable media for controlling processor card power consumption in a network test equipment chassis that includes a plurality of processor cards.

SUMMARY

Methods, systems, and computer readable media for controlling processor card power consumption in a network test equipment chassis that includes a plurality of processor cards are disclosed. According to one embodiment, the method is conducted in a network test equipment chassis that includes a plurality of processor cards that implements network testing functions. The method includes detecting an event or status associated with one of the plurality of processor cards and determining whether the event or status satisfies a condition of at least one power management rule. In response to determining that the event or status satisfies a condition of the at least one power management rule, the method further includes adjusting power consumption of the processor card in the network test equipment in accordance with the at least one power management rule.

The subject matter described herein may be implemented in software in combination with hardware and/or firmware. For example, the subject matter described herein may be implemented in software executed by a processor (e.g., a hardware-based processing unit). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the terms "function" or "module" refer to software in combination with hardware and/or firmware for implementing features described herein. In some embodiments, a module may include a hardware-based circuit, a field-programmable gate array (FPGA), an application-specific integrated circuit (ASIC), or a software program executed by a processor.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for controlling processor card power consumption in a network test equipment chassis that includes a plurality of processor cards. For example, the present subject matter may pertain to the controlling of one or more load modules in a network test equipment (NTE) chassis. As used herein, a load module includes a special purpose processor card that generates and sends packets to a device under test to load test the device under test. In one embodiment, an NTE chassis may include a chassis manager module that is configured to monitor certain conditions that may activate a power management trigger. As used herein, a chassis manager module includes a processor card separate from the load modules that controls the overall operation of the chassis in which the load modules are inserted. In an alternate embodiment, each load module or other processor card may be equipped with a backplane power interconnect and control module that monitors for certain conditions that may activate the power management trigger for the individual processor card. Upon detecting a condition that activates a power management trigger, the chassis manager module may query a power management rules (PMR) database to determine the appropriate power management rule(s) (e.g., power management triggers) to apply to one or more processor cards in the chassis. In some embodiments, the chassis manager module sends a signaling message containing the power management rule(s) to the appropriate one or more processor cards. Upon adjusting its power consumption in accordance to the power management rule(s), a processor card may communicate a confirmation message to the chassis manager module, which subsequently updates the processor card status. The chassis manager module may also utilize a card status display module to display the updated processor card status to a test system user. Although the following disclosure describes methods, systems, and computer readable medium for automatically adjusting the power consumption of an individual processor card in a NTE, manual methods (e.g., system operator utilizing a configuration graphical user interface (GUI)) may be employed without departing from the scope of the present subject matter.

Figure 1:
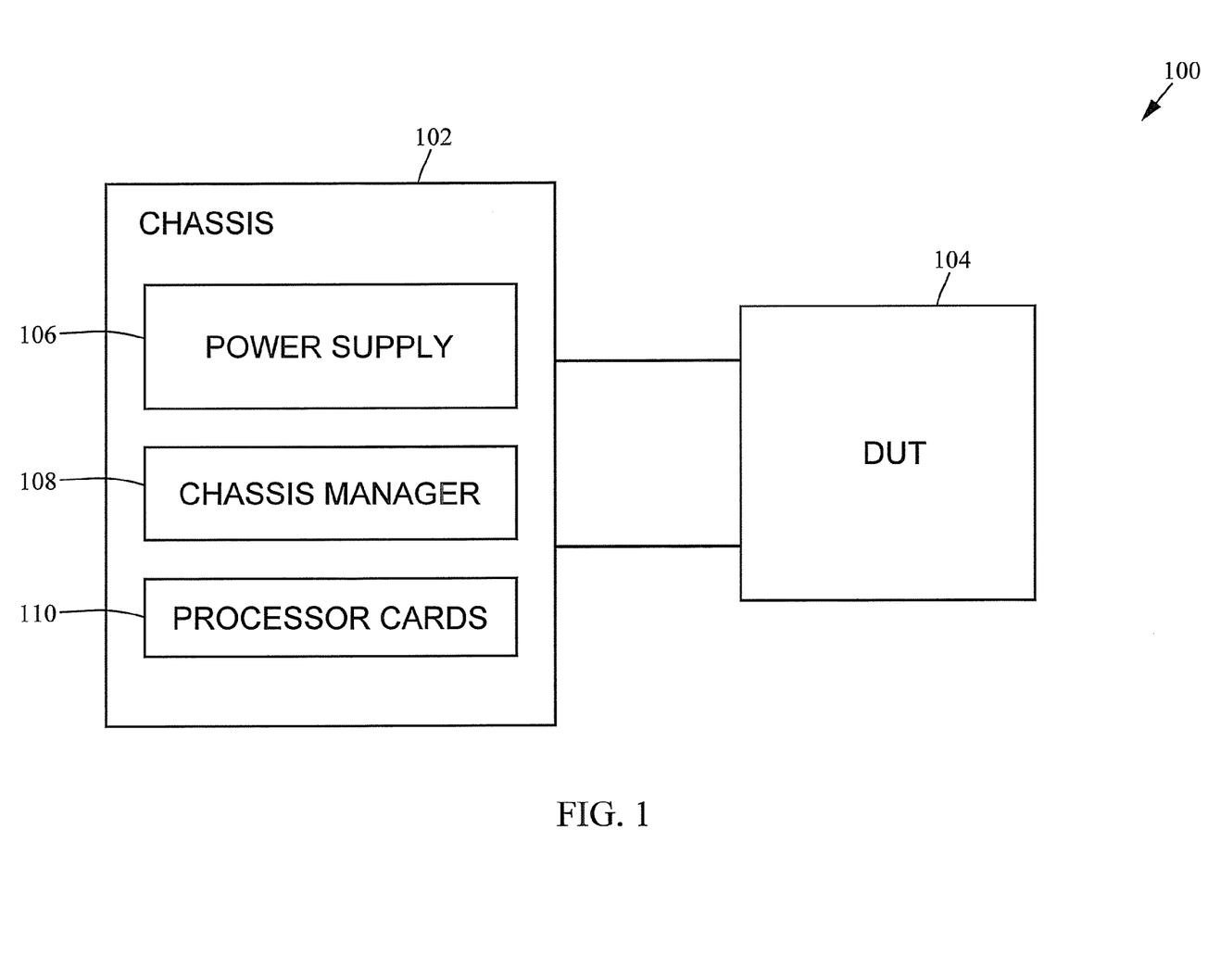
FIG. 1 is a diagram illustrating an exemplary network test system including a network test equipment chassis connected to a device under test according to an embodiment of the subject matter described herein.

FIG. 1 depicts an exemplary network test system 100 including a network test equipment chassis 102 connected to a device under test (DUT) 104. In some embodiments, NTE chassis 102 may be configured to generate simulated packet traffic that is directed to DUT 104. NTE chassis 102 may also be configured to receive packet traffic (e.g., query messages, response messages, control signaling messages, and the like) originating from DUT 104. Although FIG. 1 depicts a wired communications connection between NTE chassis 102 and DUT 104, a wireless communications connection may be implemented without departing from the scope of the present subject matter. In some embodiments, NTE chassis 102 may include processor cards 110 that implement network test functions. In one exemplary implementation, processor cards 110 may include load modules that load test or stress test DUT 104. As shown in FIG. 1, NTE chassis 102 may also include a power supply 106 and a chassis manager module 108, each of which is described in more detail below. In some embodiments, DUT 104 may include any network element capable of being subjected to simulation testing (e.g., packet traffic communication simulation) in a test environment. An exemplary DUT may include, but not limited to, a network address translator (NAT), a firewall, a router, a switch, a proxy server, a gateway, and the like.

Figure 2:
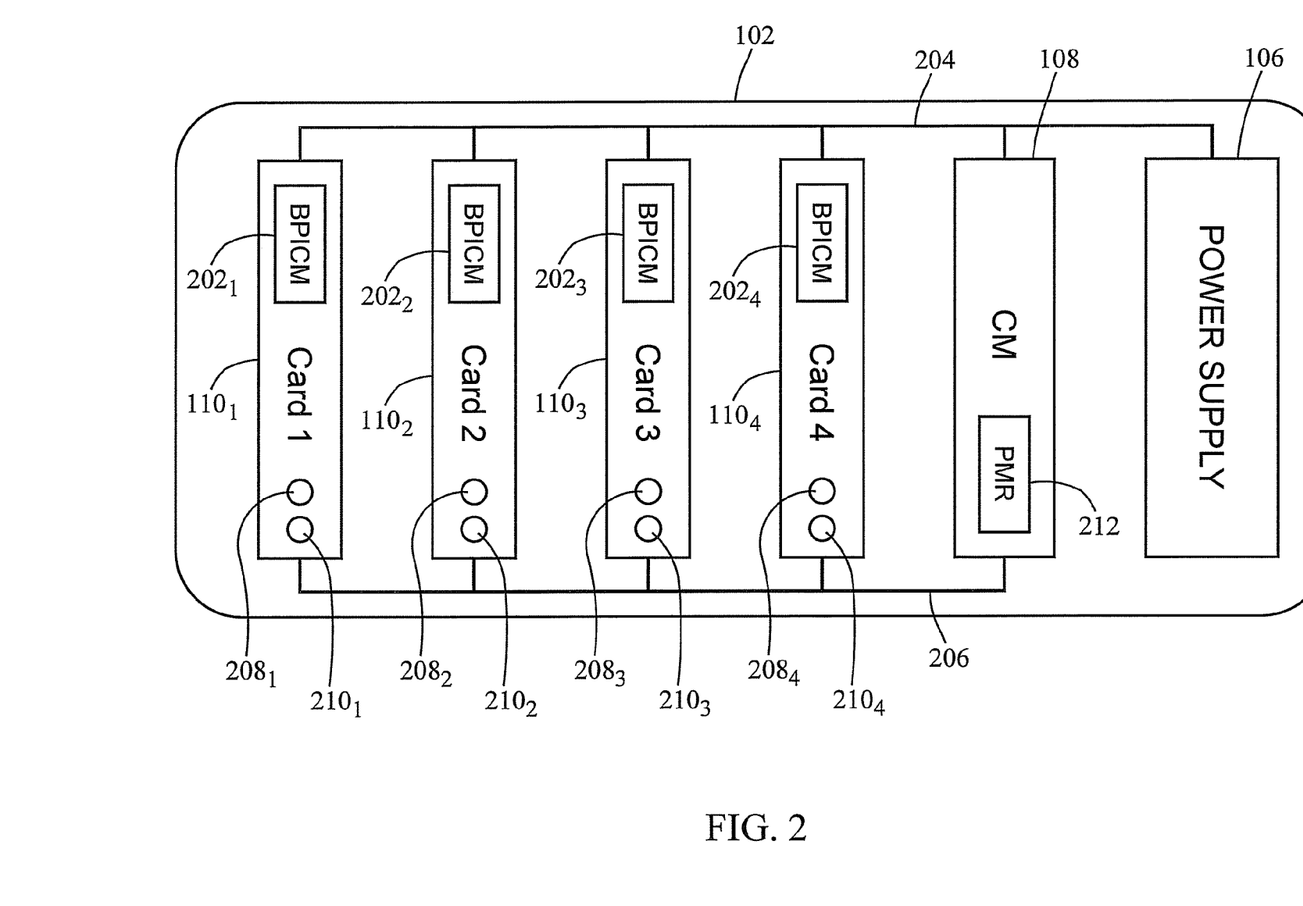
FIG. 2 is a diagram illustrating an exemplary architecture for network test equipment chassis according to an embodiment of the subject matter described herein.

FIG. 2 depicts an exemplary architecture for NTE chassis 102 in more detail according to an embodiment of the subject matter described herein. Referring to FIG. 2, NTE chassis 102 includes a plurality of processor cards $110_{1...4}$, a power supply 106, and a chassis manager module 108 that are connected together via an internal power bus 204. Internal power bus 204 may be configured to provide electrical power generated by power supply 106 to chassis manager module 108 and processor cards $110_{1...4}$. In some embodiments, processor cards $110_{1...4}$ and chassis manager module 108 can also be communicatively connected via an internal communications bus 206 (e.g., a backplane, midplane, and the like) that facilitates the exchange of communications signals and/or messages among these components of NTE chassis 102. Although FIG. 2 only depicts four processor cards $110_{1...4}$, any number of processor cards may be utilized without departing from the scope of the present subject matter.

In some embodiments, each of processor cards $110_{1...4}$ includes a backplane power interconnect and control module (BPICM) 202, which may function as an interface between a processor card 110 and internal power bus 204. Moreover, electrical power sourced at power supply 106 is received and managed at processor cards $110_{1...4}$ by the respective resident BPICMs $202_{1...4}$. In some embodiments, each processor card 110 may also include a plurality of test ports, such as at least one transmit test port 208 and at least one receive test port 210 for respectively transmitting packets to and receiving packets from a device under test.

Figure 3:
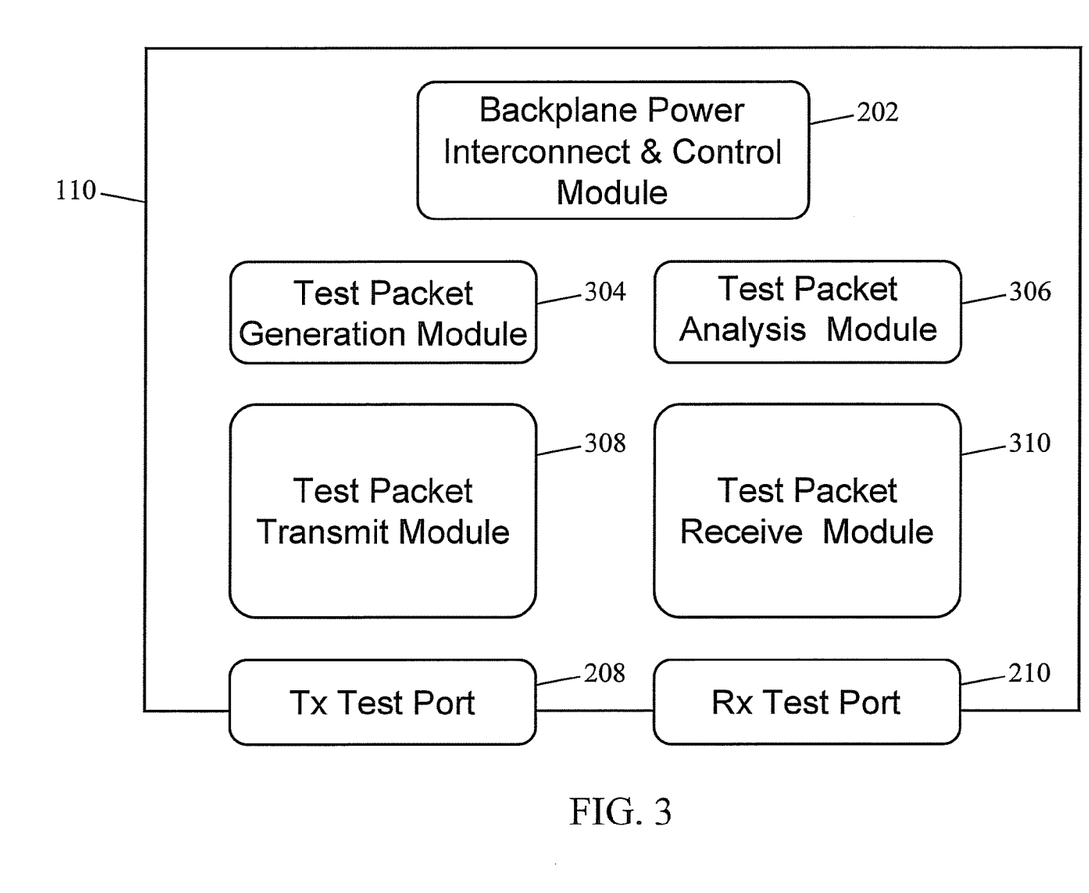
FIG. 3 is a diagram illustrating an exemplary architecture for a processor card according to an embodiment of the subject matter described herein.

FIG. 3 illustrates an exemplary architecture for a processor card 110 in more detail according to an embodiment of the subject matter described herein. Referring to FIG. 3, processor card 110 includes BPICM 202, a test packet generation module 304, a test packet analysis module 306, a test packet transmit module 308, and a test packet receive module 310. In one embodiment, test packet generation module 304 can be configured to generate test packets of simulated traffic data directed to a DUT (e.g., DUT 104 shown in FIG. 1). Processor card 110 may also include a test packet transmit module 308 that is responsible for transmitting the test packets generated by test packet generation module 304 to the DUT via transmit test port 208. In some embodiments, processor card 110 may also include a test packet receive module 310 that is configured to receive data packets or signaling packets from a DUT via a receive test port 210.

Referring back to FIG. 2, chassis manager module 108 in NTE chassis 102 may include any hardware and/or software based module that is configured to manage and control processor cards $110_{1...4}$ residing in NTE chassis 102. For example, chassis manager module 108 may be configured to exchange power state control and confirmation information with processor cards $110_{1...4}$, store processor card power state/status information, and display processor card power state/status information to users of network test system 100. Chassis manager module 108 may also be used to program field programmable gate arrays (FPGAs) on processor cards 110, start and stop transmission of test traffic, read statistics associated with conducted test, a communicate with client applications.

In some embodiments, chassis manager module 108 may also be configured to monitor events existing in the test network and/or the processor cards $110_{1...4}$ and determine if a detected event (or combination of events) activates a power management rule (e.g., satisfy and/or match the condition(s) of a power management rule/trigger). For example, in the embodiment depicted in FIG. 2, chassis manager module 108 may be configured to monitor one or more conditions, such as i) the time of day, ii) the day of week, iii) whether a processor card is currently transmitting data (e.g., test packets), iv) whether a processor card is currently receiving data (e.g., test packets), v) whether a processor card is capturing and/or analyzing data (e.g., test packets), vi) whether packets received from a DUT are exhibiting latency or not and vii) whether messages are being received from clients to activate or deactivate specific processor cards.

Upon detecting an event/status existing in the test network and/or the processor cards that activates a power management trigger, chassis manager module 108 may also be configured (e.g., equipped with logic) to determine power management rules associated with the detected power management trigger stored in a power management rules (PMR) database 212. In the embodiment depicted in FIG. 2, chassis manager module 108 may be configured to include, or have access to, a local power management rules (PMR) database 212. PMR database 212 may include any hardware and/or software-based data storage structure (e.g., SRAM, DRAM, etc.) configured to store data. For example, PMR database 212 may contain power management rules for each of the plurality of processor cards $110_{1...4}$. In some embodiments, the power management rules in PMR database 212 may include power reduction rules and/or power escalation rules.

As used herein, a power management rule (e.g., a power reduction rule) may specify: i) when the power supplied to at least one processor card is to be reduced and/or ceased, ii) the amount of power reduction associated with at least one processor card, and iii) the amount of time in which power supplied to at least one processor card should be reduced and/or ceased. Similarly, a power management rule (e.g., a power escalation rule) may specify i) when the power supplied to at least one processor card is increased and/or initiated, ii) the amount of power increase associated with at least one processor card, and iii) the amount of time the power provided to at least one processor card should be increased/applied.

In some embodiments, chassis manager module 212 may continually monitor each processor card with respect to the power management rules in PMR database 212 to determine if the condition associated with a power management rule is satisfied. If the condition associated with any one or more of the rules is satisfied, chassis manager module 108 may invoke a corresponding power management action, such as powering up or powering down the processor card.

Figure 4:
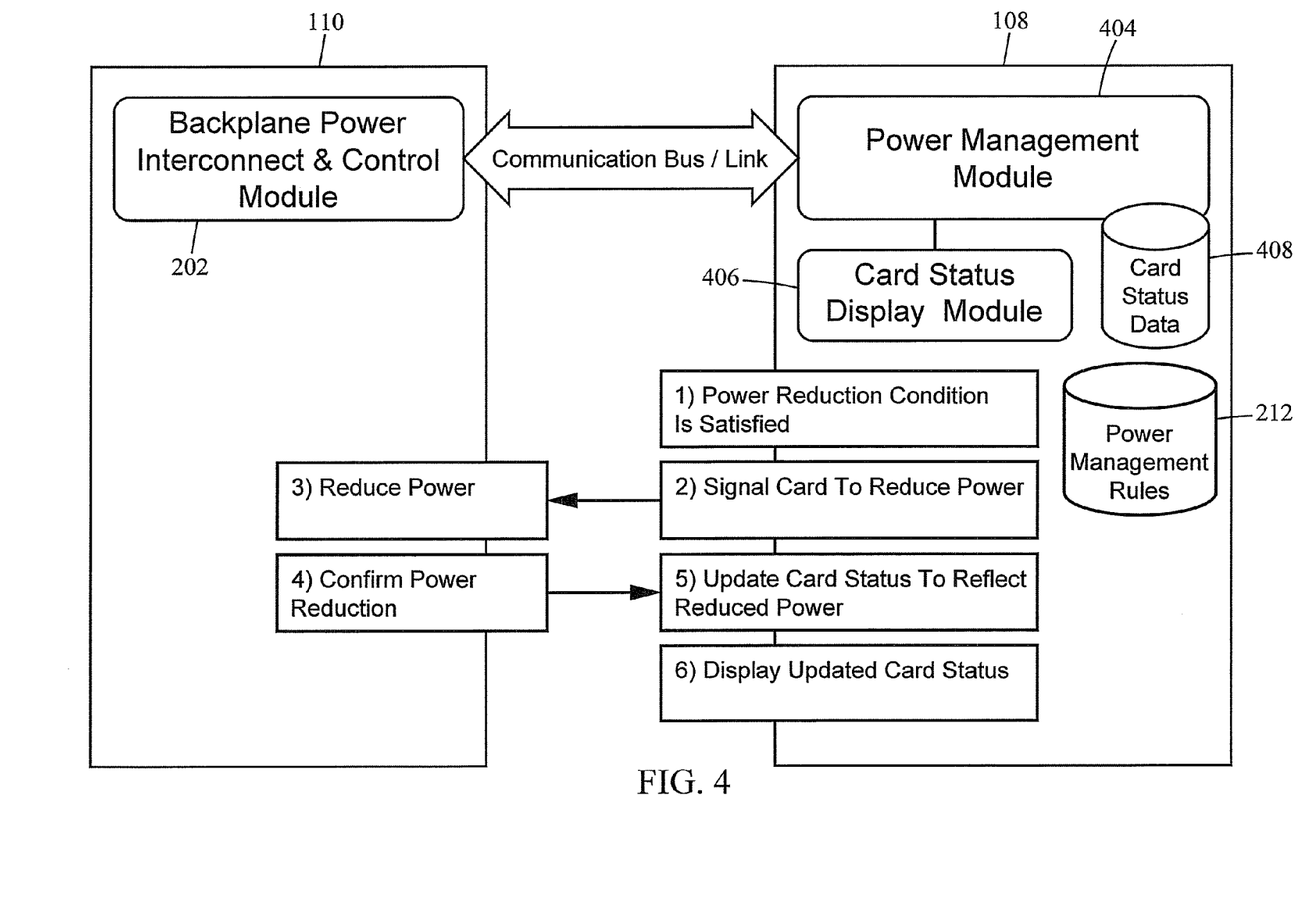
FIG. 4 is a diagram illustrating the exchange of exemplary intra-chassis communications conducted between a processor card and chassis manager module for reducing power consumption by an individual processor card according to an embodiment of the subject matter described herein.

FIG. 4 depicts an exchange of exemplary intra-chassis communications conducted between a processor card 110 and chassis manager module 108 for reducing power consumption by an individual processor card 110. Referring to FIG. 4, communications between a BPICM 202 on processor card 110 and a power management module 404 (e.g., a card status administration module) in chassis manager module 108 may be facilitated via a communication bus (e.g., communications bus 206 as shown in FIG. 2). Power management module 404 may also maintain a card status database 408 for storing the current status and condition information (e.g., active or inactive) pertaining to each processor card (e.g., processor card 110 in FIG. 4) contained in an NTE. Chassis manager module 108 further includes a card status display module (CSDM) 406 that can be configured to provide display information regarding the status/state of one or more processor cards to a user interface or display screen associated with, or communicatively connected to, NTE chassis 102. Chassis manager module 108 also includes power management rules (PMR) database 212 that is configured to store and maintain a plurality of power management triggers (e.g., rules and conditions) associated with each processor card (e.g., processor card 110 in FIG. 4) in an NTE.

Referring to block 1 in FIG. 4, chassis manager module 108 may detect an event or status associated with the network and/or at least one processor card that satisfies a condition(s) associated with one or more power management rules. For example, power management module 404 may continually monitor the processor card states in order to determine whether a condition associated with a power management rule in database 212 is satisfied. In this example, it is assumed that power management module 404 determines that processor card 110 has been inactive for a time period that satisfies a power reduction condition associated with a power management rule in database 212. The power management action associated with the power management rule may be to power down the card. Accordingly, power management module 404 may signal the processor card to power down.

Upon receiving the signaling message from power management module 404, BPICM 202 may be configured to reduce the power demands of processor card 110 by either powering off the processor card or commanding the processor to enter a sleep state and/or standby state (see block 3). In one embodiment, BPICM 202 may also be configured to send a confirmation message to power management module 404 that indicates the reduction of power consumption at processor card 110 (see block 4). After receiving the confirmation message from BPICM 202, chassis manager module 108 may utilize power management module 404 to update the card status database 408 to reflect the reduced power and/or sleep/standby state associated with processor card 110, e.g., log the processor card power state change information (see block 5). In addition, chassis manager module 108 may also utilize CSDM 406 to provide the updated card status information to a user interface or display utilized by a user of test system 100 (see block 6).

In an alternate embodiment, BPICM 202 may be configured to detect conditions associated with the network and/or at least one processor card that activate a power reduction trigger. For example, BPICM 202 may be configured to monitor for network or processor card conditions (e.g., receive data) and subsequently detect a condition that indicates that a power reduction trigger has been activated. In one embodiment, data indicating the condition may be received by BPICM 202 on processor card 110. Alternatively, the data may be received by BPICM 202 from other components in NTE chassis 102. Upon the activation of the power reduction trigger, BPICM 202 may access a local PMR database located on processor card 110 (e.g., PMR database 612 shown below in FIG. 6) to obtain power management rules corresponding to the identified power reduction trigger. Afterwards, BPICM 202 may reduce the power consumption of processor card 110 and/or compel the processor card to enter a sleep/standby state. BPICM 202 may also be configured to send a confirmation message to power management module 404 that indicates the reduction of power consumption at processor card 110. After receiving the confirmation message from BPICM 202, chassis manager module 108 may utilize power management module 404 to update the card status database 408 to reflect the reduced power and/or sleep/standby state associated with processor card 110, e.g., log the processor card power state change information. In addition, chassis manager module 108 may also utilize CSDM 406 to provide the updated card status information to a user interface or display utilized by a user of test system 100.

Figure 5:
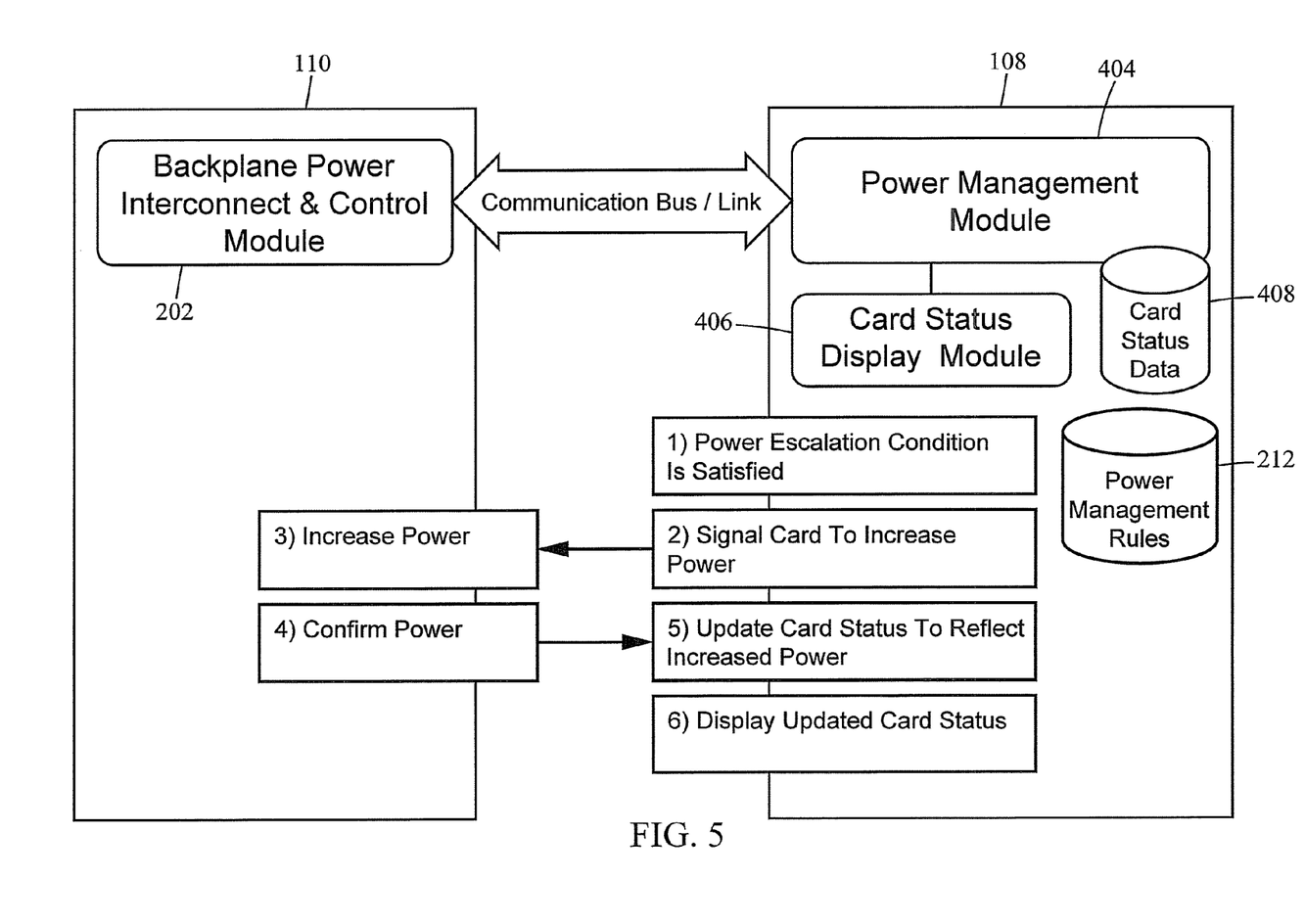
FIG. 5 is a diagram illustrating the exchange of exemplary intra-chassis communications conducted between a processor card and chassis manager module for escalating power consumption by an individual processor card according to an embodiment of the subject matter described herein.

FIG. 5 depicts an exchange of exemplary intra-chassis communications related to power escalation conducted between a processor card 110 and chassis manager module 108 (not unlike processor 110 and chassis manager module 108 shown in FIG. 2) for increasing power consumption by an individual processor card 110. Referring to FIG. 5, communications between BPICM 202 in processor card 110 and a power management module 404 in chassis manager module 108 can be facilitated via a communication bus (e.g., communications bus 206 as shown in FIG. 2). As described above in the description of FIG. 4, chassis manager module 108 also includes a card status database 408, a card status display module (CSDM) 406, and a power management rules (PMR) database 212.

Referring to block 1 of FIG. 5, chassis manager module 108 may detect an event or status associated with the network and/or at least one processor card that satisfies conditions associated with one or more power management rules. For example, power management module 404 may monitor card states to determine whether a condition associated with a power management rule in database 212 is satisfied. In this example, it is assumed that power management module 404 determines that processor card 110 is needed for a use that corresponds to a power escalation condition associated with a power management rule in database 212. The power management action associated with the power management rule may be to initiate or power up the processor card. Accordingly, power management module 404 may signal the processor card to power up (e.g., accept power from the power supply).

Upon receiving the signaling message from power management module 404, BPICM 202 may be configured to increase the power to processor card 110 by either powering on the processor card (e.g., commanding the processor to exit a sleep state and/or standby state) or by increasing the power demands in an already active processor card (see block 3). In one embodiment, BPICM 202 may also be configured to send a confirmation message to power management module 404 that indicates the increase/escalation of power at processor card 110 (see block 4). After receiving the confirmation message from BPICM 202, chassis manager module 108 may utilize power management module 404 to update card status database 408 to reflect the increased power state associated with processor card 110, e.g., log the processor card power state change information (see block 5). In addition, chassis manager module 108 may also utilize CSDM 406 to provide the updated card status information to a user interface or display utilized by a user of test system 100 (see block 6).

Figure 6:
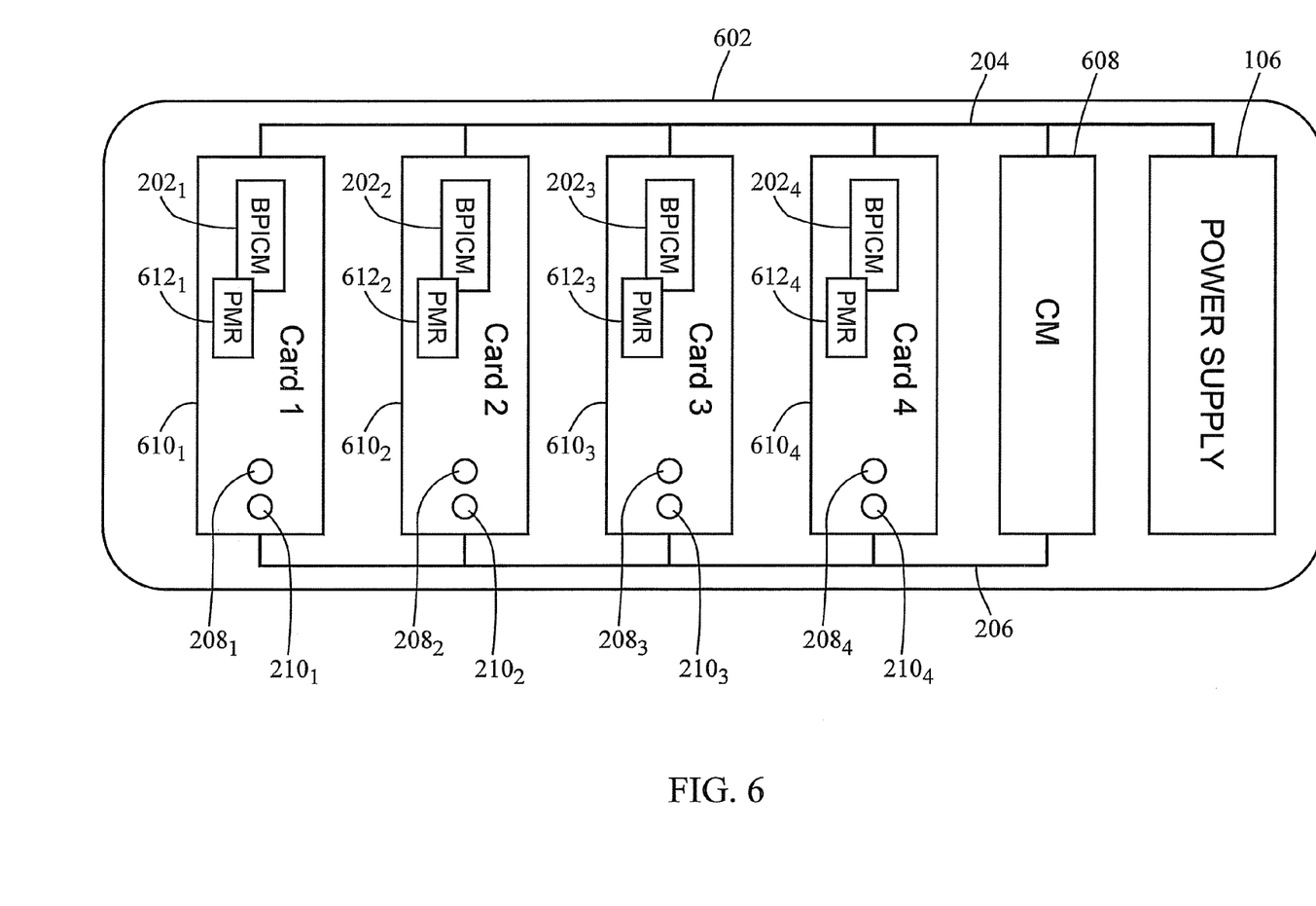
FIG. 6 is a diagram illustrating an exemplary architecture for network test equipment according to an embodiment of the subject matter described herein.

FIG. 6 depicts another exemplary NTE that may be utilized to control processor card power consumption in a test environment according to an embodiment of the subject matter described herein. Referring to FIG. 6, NTE 602 includes a plurality of processor cards $610_{1 \ldots 4}$, a power supply 106, and a chassis manager module 608 that are connected together via an internal power bus 204. In some embodiments, processor cards $610_{1 \ldots 4}$ and chassis manager 608 can also be communicatively connected via an internal communications bus 206 (e.g., a backplane, midplane, and the like) that facilitates the exchange of communications signals and/or messages.

FIG. 6 depicts a chassis 602 that is similar to NTE chassis 102 depicted in FIG. 2 in some aspects. For example, chassis 602 includes multiple processor blades or processor cards 610. Each processor card 610 is connected to an internal communication bus 206 or network. Each processor card 610 is also connected to an internal power bus 204 via BPICM 202. As such, power sourced at a chassis power supply 106 is received at each processor card 110 via the BPICM 202 that is resident on that card. Generally accessible by BPICM 220 is a local power management rules data structure or database 612 (e.g., SRAM, DRAM, etc.) that contains power management rules for card 610. Notably, in the embodiment depicted in FIG. 6, chassis manager 608 does not include a power management rules (PMR) database. However, each individual processor card 610 includes a local PMR database structure 612 that is accessible and maintained by BPICM 220. In one embodiment, the processor card may include its own power management module to handle the power management duties associated with the individual processor card. Although FIG. 6 only depicts four processor cards $110_{1 \ldots 4}$, any number of processor cards may be utilized without departing from the scope of the present subject matter.

Figure 7:
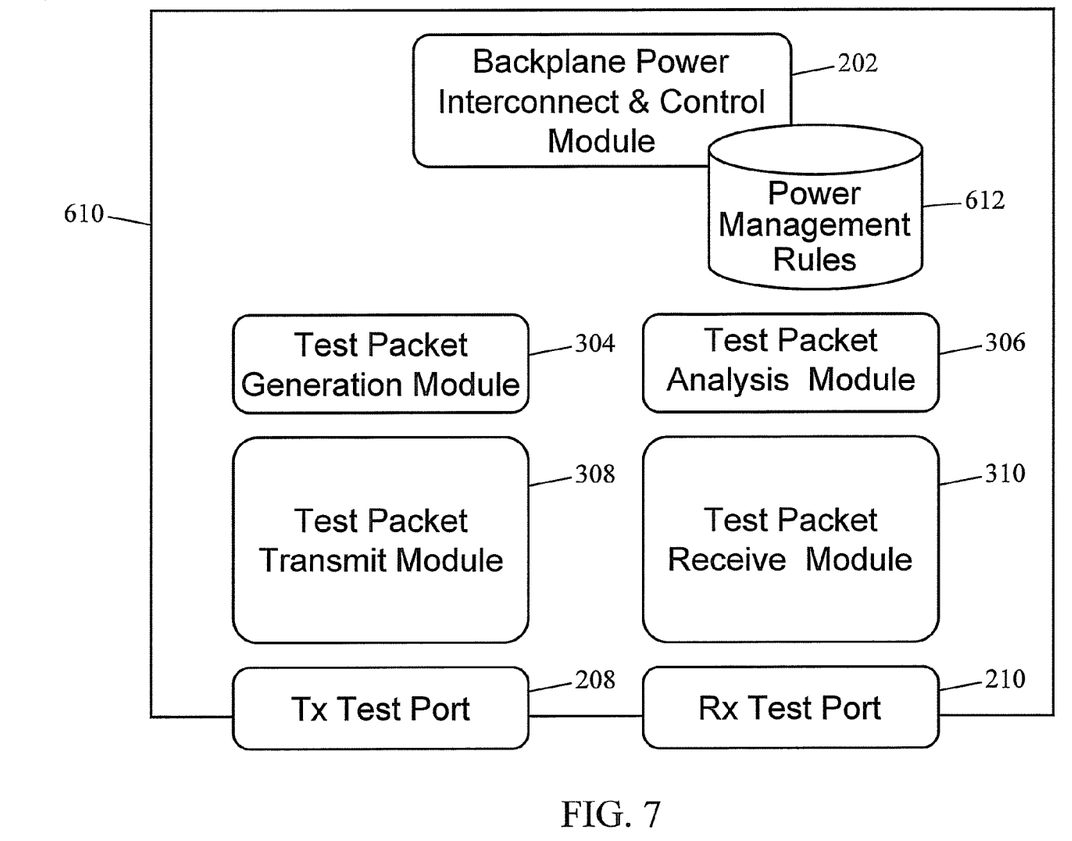
FIG. 7 is a diagram illustrating an ex exemplary architecture for a processor card according to an embodiment of the subject matter described herein.

In some embodiments, each processor card 610 may also include a plurality of test ports, such as at least one transmit test port 208 and at least one receive test port 210. An exemplary processor card that may be included in NTE chassis 102 is depicted in FIG. 7. Referring to FIG. 7, processor card 610 includes a BPICM 202. In one embodiment, power sourced at chassis power supply 106 is provided to a processor card 610 via a resident BPICM 202. Processor card 610 may also include a test packet generation module 304 that can be configured to generate test packets of simulated traffic data directed to a DUT (e.g., DUT 104 in FIG. 1). Processor card 610 may also include a test packet transmit module 308 that is responsible for transmitting test packets generated by test packet generation module 304 to the DUT via transmit test port 208. In some embodiments, processor card may also include a test packet receive module 310 that is configured to receive data packets or signaling packets from DUT 104 via a receive test port 210. Notably, processor card 610 includes a local (PMR) database 612 that contains power management rules specific to processor card 610.

Figure 8:
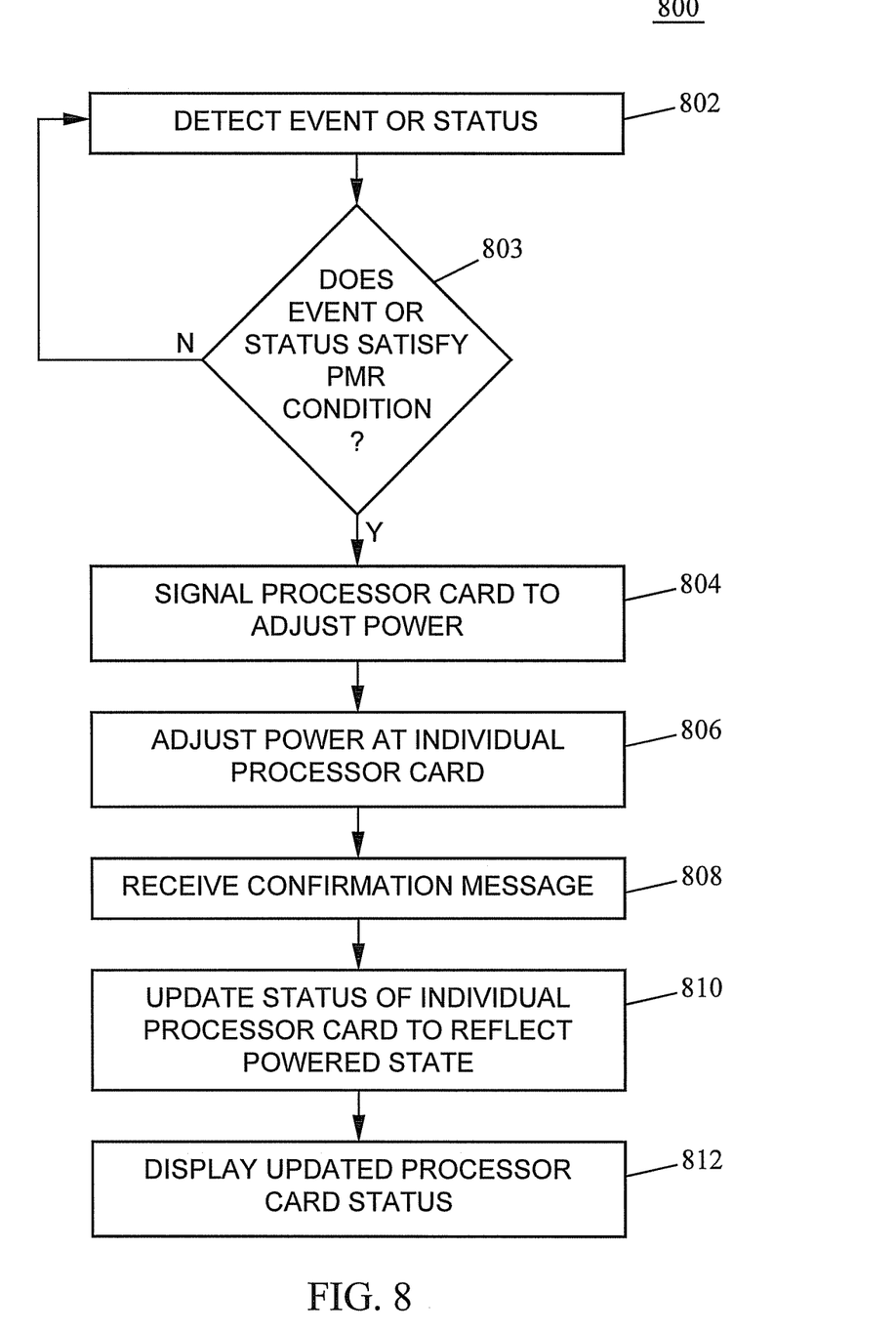
FIG. 8 is a diagram illustrating an exemplary process for controlling processor card power consumption in a network test equipment chassis that includes a plurality of processor cards according to an embodiment of the subject matter described herein.

FIG. 8 is a diagram illustrating an exemplary method 800 for controlling processor card power consumption in a network test equipment chassis that includes a plurality of processor cards according to an embodiment of the subject matter described herein. In step 802, an event or status associated with a processor card or the network is detected. In one embodiment, a chassis manager module is continuously monitoring the status and events related to processor cards in the NTE chassis with respect to power management rules in a local power management rules (PMR) database.

In step 803, a determination is made as to whether the detected event or status satisfies a power management rule condition.

In one embodiment, a power management module included in a chassis manager module is responsible for detecting if conditions associated with a power management rule or trigger is satisfied. After monitoring for and detecting an event or status that satisfies the condition of a power management rule, the power management module may invoke a corresponding power management action (e.g., powering down the card). For example, the power management module may access and/or query its local PMR database to determine what power management action(s) associated with the power management rule corresponding to the detected event or status should be applied to a processor card. In an alternate embodiment, the event or status is detected by an individual processor card. For example, a BPICM on the processor card may be configured to detect whether a condition associated with a power management rule is satisfied. For example, the BPICM may access a local PMR database on the processor card to determine what power management action associated with the power management rule corresponding to the detected event or status should be taken. If a detected event or status satisfies a power management rule condition, method 800 proceeds to step 804. Otherwise, method 800 loops back to step 802 and monitoring is resumed.

In step 804, the processor card is signaled to adjust power consumption. In one embodiment, the power management module sends a signaling message containing the power management action(s) corresponding to the satisfied power management rule to the individual processor card. Notably, the power management action(s) may direct the processor card to adjust its power consumption in a particular manner. For example, the power management actions included in the signaling message may direct the processor card to increase or decrease its power consumption. In an alternate embodiment, the BPICM may adjust the power consumption on an individual processor card in accordance to the power management rules contained in a local PMR database on the same processor card.

In step 806, the power consumption level at the processor card is adjusted. In one embodiment, the BPICM may adjust the power consumption level of the processor card based on the signaling message received from the power management module. Alternatively, the BPICM on the processor card may adjust the power consumption level of the processor card based on the power management rule(s) accessed from the local PMR database on the processor card.

In step 808, a confirmation message is received. In one embodiment, the processor card transmits a signaling message confirming that power has been adjusted appropriately on the processor card. The confirmation message may be sent by BPICM to the power management module in the chassis manager module.

In step 810, the status of the processor card is updated to reflect the powered state. In one embodiment, the power management module receives the confirmation message and registers the updated status information related to the processor card. In one embodiment, the power management module may be configured to forward the processor card status information to a local card status display module (CSDM) residing in the chassis manager module.

In step 812 the updated processor card status is displayed. In one embodiment, the CSDM receives information related to the status of the processor card from the power management module. In response, the CSDM is configured to utilize a user interface or a display screen to display the updated status of the processor card.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for controlling processor card power consumption in a network test equipment chassis that includes a plurality of processor cards, the method comprising:
in a network test equipment chassis that includes a plurality of processor cards that implements network testing functions, wherein the network test equipment chassis includes a power management rules (PMR) database that stores and maintains power management rules associated with each of the processor cards:
detecting an event or status associated with one of the plurality of processor cards;
determining whether the event or status satisfies a condition of at least one of the power management rules associated with the processor card; and
in response to determining that the event or status satisfies a condition of the at least one of the power management rules associated with the processor card, adjusting power consumption of the processor card in the network test equipment in accordance with the at least one of the power management rules associated with the processor card.

2. The method of claim 1 comprising receiving, from the processor card, a confirmation message indicating a power consumption adjustment corresponding to the at least one power management rule.

3. The method of claim 2 comprising updating a status of the processor card to reflect the power consumption adjustment in the processor card.

4. The method of claim 3 comprising providing a graphical user interface associated with the chassis to display the updated status of the processor card.

5. The method of claim 1 wherein at least one power management action corresponding to the at least one power management rule is provided to the processor card via a signaling message sent by a chassis manager module.

6. The method of claim 1 wherein determining the at least one power management rule includes querying a local power management rules database.

7. The method of claim 6 wherein the local power management rules database is located either on the processor card or a chassis manager module in the chassis.

8. The method of claim 1 wherein the event or the status is detected either by a chassis manager module in the chassis or a backplane power interconnect and control module (BPICM) on the processor card.

9. The method of claim 1 wherein a backplane power interconnect and control module (BPICM) residing on the processor card is configured to adjust the power consumption of the processor card.

10. The method of claim 1 wherein adjusting the power consumption includes either reducing the power consumption of the processor card or escalating the power consumption of the processor card.

11. The method of claim 1 wherein the plurality of processor cards includes a plurality of load modules.

12. A network test equipment chassis for controlling power consumption in at least one of a plurality of processor cards, the network testing equipment chassis comprising:
a chassis;
a plurality of processor cards located in the chassis for implementing network test functions for testing network devices;
a chassis manager module for controlling operation of the plurality of processor cards, wherein the chassis manager module includes a power management rules (PMR) database that stores and maintains power management rules associated with each of the processor cards; and
a power management module associated with the chassis manager module for detecting an event or status associated with one of the plurality of processor cards, determining whether the event or status satisfies a condition of at least one of the power management rules associated with the processor card, and in response to determining that the event or status satisfies a condition of the at least one of the power management rules associated with the processor card, adjusting power consumption of the processor card in the network test equipment in accordance with the at least one of the power management rules associated with the processor card.

13. The network test equipment chassis of claim 12 wherein the chassis manager module is further configured to receive, from the processor card, a confirmation message indicating a power consumption adjustment corresponding to the at least one power management rule.

14. The network test equipment chassis of claim 13 wherein the chassis manager module is further configured to update a card status database with a status of the processor card to reflect the power consumption adjustment of the processor card.

15. The network test equipment chassis of claim 14 wherein the chassis manager module is further configured to provide a graphical user interface associated with the chassis to display the updated status of the processor card.

16. The network test equipment chassis of claim 12 wherein the chassis manager module is further configured to send the at least one power management action corresponding to the at least one power management rule to the processor card via a signaling message.

17. The network test equipment chassis of claim 12 wherein the chassis manager module is further configured to determine the at least one power management rule by querying a local power management rules database.

18. The network test equipment chassis of claim 12 wherein the BPICM is further configured to reduce the power consumption of the processor card or escalate the power consumption of the processor card based on the at least one power management rule.

19. The network test equipment chassis of claim 12 wherein the plurality of processor cards includes a plurality of load modules.

20. A network testing equipment for controlling power consumption in at least one of a plurality of processor cards, the network testing element comprising:
   a chassis;
   a plurality of processor cards located in the chassis for implementing network test functions for testing network devices, wherein each of the plurality of processor cards includes a backplane power interconnect and control module (BPICM), wherein each BPICM includes a power management rules (PMR) database that stores and maintains power management rules associated with the processor card and wherein each BPICM is configured for:
      detecting an event or status associated with the processor card,
      determining whether the event or status satisfies a condition of at least one of the power management rules associated with the processor card, and
      in response to determining that the event or status satisfies a condition of the at least one of the power management rules associated with the processor card, adjusting power consumption of the processor card in the network test equipment in accordance with the at least one of the power management rules associated with the processor card; and
   a chassis manager module for controlling operation of the plurality of processor cards.

21. The network testing module of claim 20 wherein the chassis manager module is further configured for updating a card status database with a status of the processor card to reflect the power consumption adjustment of the processor card.

22. The network testing element of claim 20 wherein the chassis manager module is further configured for utilizing a card status display module to display the updated status of the processor card on a user interface or a display screen of the NTE.

23. The network testing element of claim 20 wherein the BPICM is further configured for determining the at least one power management rule by querying a local power management rules database on the processor card.

24. The network testing element of claim 22 wherein the BPICM is further configured for reducing the power consumption of the processor card or escalating the power consumption of the processor card based on the at least one power management rule.

25. The network testing element of claim 22 wherein the plurality of processor cards includes a plurality of load modules.

26. A non-transitory computer readable medium comprising computer executable instructions that when executed by a processor of a computer control the computer to perform steps comprising:
   in an network test equipment chassis that includes a plurality of processor cards that implements network testing functions, wherein the network test equipment chassis includes a power management rules (PMR) database that stores and maintains power management rules associated with each of the processor cards:
      detecting an event or status associated with one of the plurality of processor cards;
      determining whether the event or status satisfies a condition of at least one of the power management rules associated with the processor card; and
   in response to determining that the event or status satisfies a condition of the at least one of the power management rules associated with the processor card, adjusting power consumption of the processor card in the network test equipment in accordance with the at least one of the power management rules associated with the processor card.

* * * * *